(12) United States Patent
Skelton et al.

(10) Patent No.: US 11,555,825 B1
(45) Date of Patent: Jan. 17, 2023

(54) PITOT PROBE ASSEMBLY WITH REPLACEABLE TIP AND DAMPING

(71) Applicant: Sentera, Inc., Minneapolis, MN (US)

(72) Inventors: Matt Skelton, Minneapolis, MN (US); Todd Colten, Minneapolis, MN (US); Matthew Finn, Minneapolis, MN (US)

(73) Assignee: Sentera, Inc., St. Paul, MN (US)

( * ) Notice: Subject to any disclaimer, the term of this patent is extended or adjusted under 35 U.S.C. 154(b) by 283 days.

(21) Appl. No.: 17/103,068

(22) Filed: Nov. 24, 2020

(51) Int. Cl.
| | |
|---|---|
| *G01P 5/16* | (2006.01) |
| *G01P 5/165* | (2006.01) |
| *G01L 19/00* | (2006.01) |
| *B64C 39/02* | (2006.01) |

(52) U.S. Cl.
CPC ............ *G01P 5/165* (2013.01); *B64C 39/024* (2013.01); *G01L 19/0007* (2013.01); *B64C 2201/021* (2013.01); *B64C 2201/12* (2013.01)

(58) Field of Classification Search
CPC . G01P 5/165; B64C 39/024; B64C 2201/021; B64C 2201/12; G01L 19/0007
See application file for complete search history.

(56) References Cited

U.S. PATENT DOCUMENTS

| | | | |
|---|---|---|---|
| 2,650,497 | A | 9/1953 | Renwanz |
| 5,597,952 | A | 1/1997 | Struyk |
| 6,557,423 | B1 | 5/2003 | Vozhdaev et al. |
| 6,591,696 | B2 | 7/2003 | Bachinski |
| 8,413,501 | B2 | 4/2013 | Tavares et al. |
| 10,435,143 | B1 | 10/2019 | O'Brien et al. |
| 11,371,901 | B2 * | 6/2022 | Chou ............ G01L 19/16 |
| 2014/0216164 | A1 * | 8/2014 | Chou ............ G01L 7/163 |
| | | | 73/732 |
| 2017/0267372 | A1 | 9/2017 | Donnard et al. |

FOREIGN PATENT DOCUMENTS

| | | |
|---|---|---|
| CN | 205861713 | 1/2017 |
| CN | 108761125 | 11/2018 |
| CN | 110320383 | 10/2019 |
| GB | 855906 | 12/1960 |

* cited by examiner

*Primary Examiner* — Freddie Kirkland, III
(74) *Attorney, Agent, or Firm* — Hamre, Schumann, Mueller & Larson, P.C.

(57) ABSTRACT

A pitot probe assembly that is formed from modular, replaceable components, and is flexible. The configuration of the pitot probe assembly allows the pitot probe assembly to absorb and/or dissipate impact energy, and the modular, replaceable components allow for quick and easy repair of the pitot probe assembly. The pitot probe assembly can be configured as a total pressure pitot probe assembly or as a pitot static probe assembly.

16 Claims, 3 Drawing Sheets

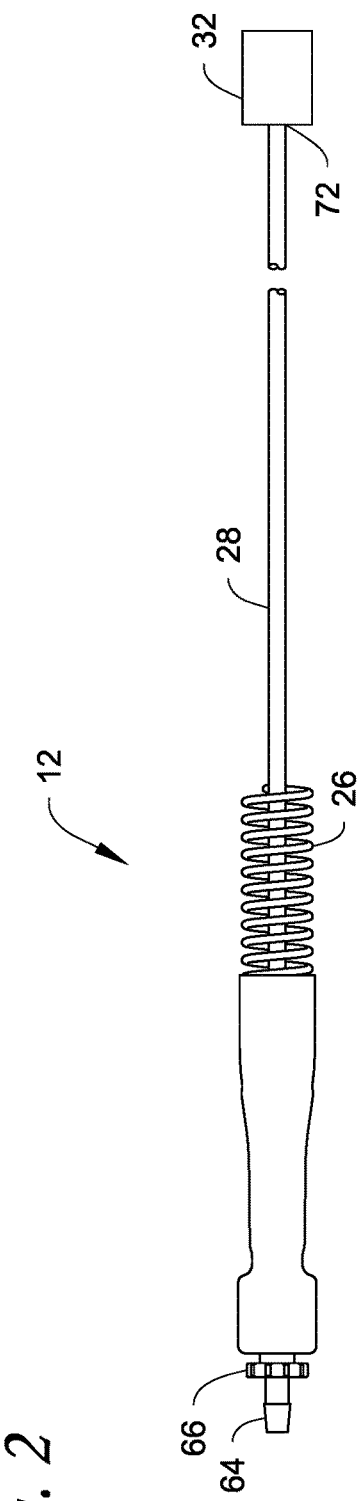
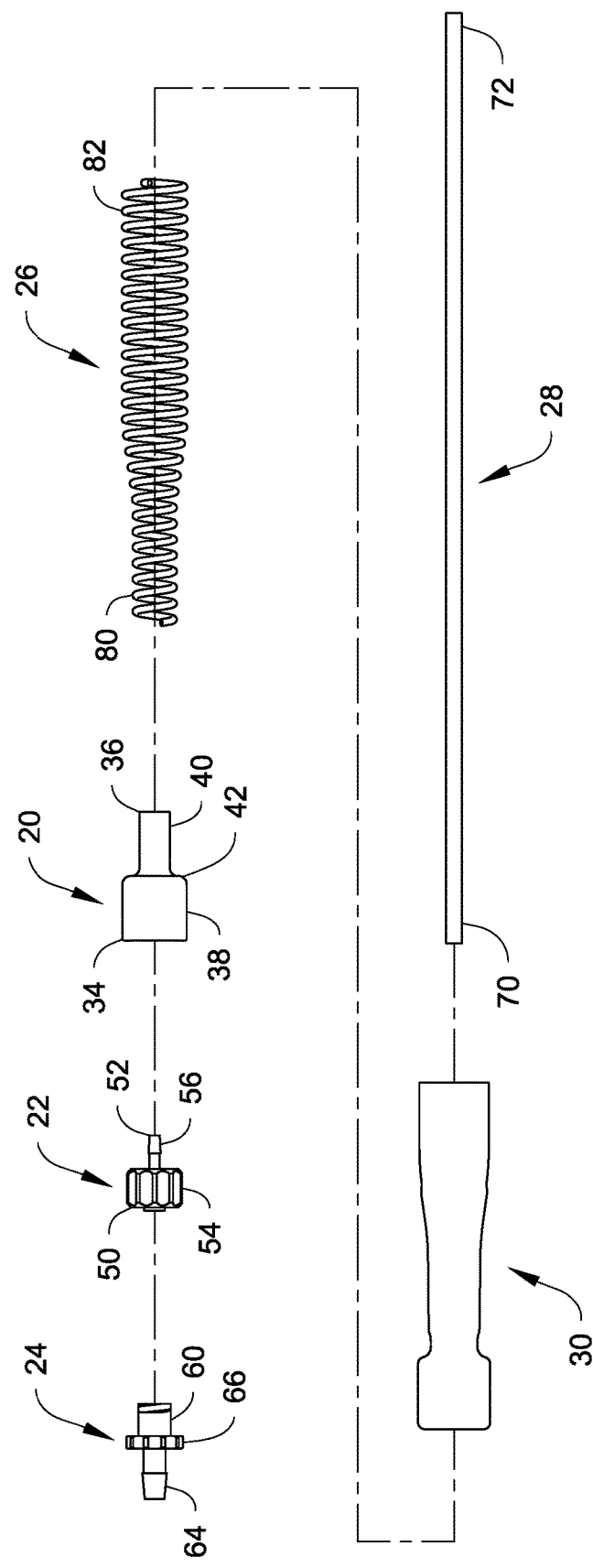

PITOT PROBE ASSEMBLY WITH REPLACEABLE TIP AND DAMPING

FIELD

This technical disclosure relates to a pitot probe assembly for measuring pressure in an airflow.

BACKGROUND

The use of pitot probes to measure pressure in airflows is well known. The pitot probes can be configured to measure total pressure (i.e. a total pressure pitot probe) or configured to measure total pressure and static pressure (i.e. a pitot static probe).

Pitot probes are commonly used on aircraft including unmanned aerial vehicles (UAVs) and other light aircraft. In the case of UAVs, the pitot probes are typically mounted so that they protrude far out from the wing structure or fuselage. This positions the end of the probe out of the pressure field generated by the motion of the UAV through the air. This positioning allows the probe to read the free stream pressures. For some UAVs, having a rigid probe protruding from the wing or fuselage is not ideal because the probe is prone to being damaged, for example when the UAV lands. For example, if a UAV lands in a roadside ditch, the pitot probe may impact with a patch of thick weeds. The force of the impact may damage the pitot probe. To check for damage to the pitot probe, the operation of the pitot probe can be tested and/or some or all of the pitot probe can be mechanically disassembled to visually inspect the components for damage. This check for damage, which can occur after every flight of the UAV, is time consuming and expensive and reduces the availability of the UAV for use.

SUMMARY

A pitot probe assembly is described that is formed from modular, replaceable components, and is flexible. The configuration of the pitot probe assembly allows the pitot probe assembly to absorb and/or dissipate impact energy, and the modular, replaceable components allow for quick and easy repair of the pitot probe assembly. In one embodiment, the pitot probe assembly is configured as a total pressure pitot probe assembly. In another embodiment, the pitot probe assembly can be configured as a pitot static probe assembly.

The described pitot probe assembly can be used in any application and in any environment where measurement of pressure using a pitot probe assembly can be performed. In one embodiment, the pitot probe assembly can be used on a UAV. The UAV can be used to capture images of an agricultural field for use in precision agriculture.

The pitot probe assembly can include a sleeve member, a socket member attached to the sleeve member, a plug attached to the socket member and forming a tip end of the pitot probe assembly, a coil spring engaged with the sleeve member, a tube extending through the coil spring and having a first end attached to the socket member and a second end attached to a pressure sensor, and a damper shroud surrounding at least a portion of the coil spring. The plug may be removably attached to the socket member to allow replacement of the tip of the pitot probe assembly in the event of damage to the plug. The socket member may also be removably attached to allow replacement of the socket member in the event of damage.

In one embodiment, a pitot probe assembly can include a sleeve member having a receptacle portion that extends from a first end of the sleeve member toward a second end thereof, and a post portion that extends from the second end toward an end of the receptacle portion. The receptacle portion includes a receptacle extending from the first end toward the second end. In addition, a sleeve passageway extends through the sleeve member from the first end to the second end. A socket member is at least partially received in the receptacle of the receptacle portion, and the socket member includes a socket passageway extending therethrough that is aligned with the sleeve passageway through the sleeve member. A plug is removably attached to the socket member and forms a tip end of the pitot probe assembly, and the plug includes a plug passageway extending therethrough that is aligned with the socket passageway and with the sleeve passageway. A coil spring is also provided that has a first end surrounding the post portion of the sleeve member, and a tube extends through the coil spring and has a first tube end attached to the socket member.

In another embodiment, a total pressure pitot probe assembly can include a sleeve member having a sleeve passageway extending through the sleeve member from a first end to a second end thereof. A socket member is attached to the sleeve member, and the socket member includes a socket passageway extending therethrough that is aligned with the sleeve passageway. A plug is attached to the socket member and forms a tip end of the total pressure pitot probe assembly, and the plug includes a plug passageway extending therethrough that is aligned with the socket passageway and with the sleeve passageway. A coil spring is provided that has a first end engaged with the sleeve member, and a tube extends through the coil spring and has a first tube end attached to the socket member. A damper shroud surrounds and contacts at least a portion of the coil spring. The damper shroud acts as a damper on the coil spring and also seals the coil spring to prevent ingress of contaminants.

DRAWINGS

FIG. 2 is a side view of the pitot probe assembly removed from the aircraft together with a pressure sensor.

FIG. 3 is an exploded view of the pitot probe assembly of FIG. 2.

DETAILED DESCRIPTION

Figure 1:
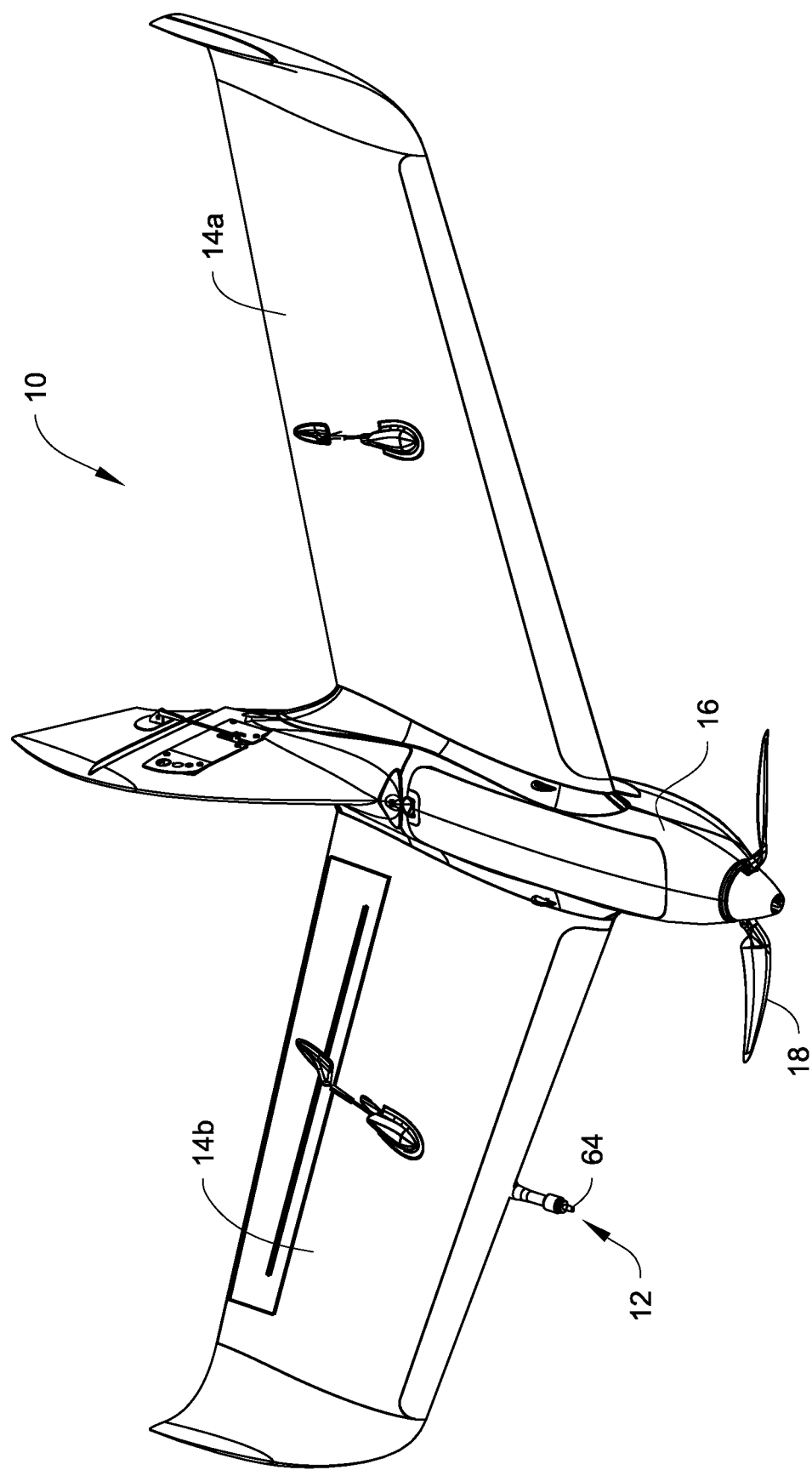
FIG. 1 is an upper perspective view of an aircraft on which the pitot probe assembly described herein is mounted.

Referring to FIG. 1, a UAV 10 is illustrated that includes at least one pitot probe assembly 12 described herein. In this example, the UAV 10 is illustrated as a fixed-wing UAV with a pair of fixed wings 14a, 14b extending from a fuselage 16. A propulsion system that includes a rotatable propeller 18 is provided for propelling the UAV 10 during flight. In other embodiments, the UAV 10 can be a quad-copter or quad-rotor UAV.

The UAV 10 can include a camera (not shown), one or more batteries (not shown), a navigation sensor (not shown), a transceiver (not shown), image storage and data storage (not shown), one or more processors (for example a CPU or GPU or FPGA), a data input/output port (not shown), and other known features. The camera can be a conventional camera known in the art for capturing one or more images of an agricultural field. The camera can be a gimballed or fixed position video camera. The propeller 18 rotates to provide the propulsion for the UAV 10, driven by an electric motor with power provided by the battery. The battery, which may be rechargeable, provides stored electrical energy for powering the various electrical components of the UAV 10. The navigation sensor may include an inertial measurement unit (IMU), which may include an accelerometer and gyroscope to output roll, pitch, yaw, acceleration, or approximate velocity of the UAV 10 calculated based on acceleration. The navigation sensor may include a compass to provide heading or a global navigation satellite system (GNSS), such as the Global Positioning System (GPS) to provide location. In an example, the navigation sensor may include a tightly coupled IMU and GNSS system, where the IMU data is used to reduce noise in the GNSS positioning accuracy and the GNSS data is used to reduce inertial positioning noise (e.g., drift). The transceiver can be any conventional transceiver known in the art for wirelessly transmitting and receiving data/commands. The construction and operation of these elements of a UAV are well known in the art.

With continued reference to FIG. 1, the pitot probe assembly 12 is mounted on and projects from one of the fixed wings 14a, 14b, for example in the illustrated example from the leading edge of the wing 14b. However, the pitot probe assembly 12 (or another pitot probe assembly 12) can be mounted on and project from other locations on the wing 14b, from the wing 14a and/or from the fuselage 16.

Figure 4:
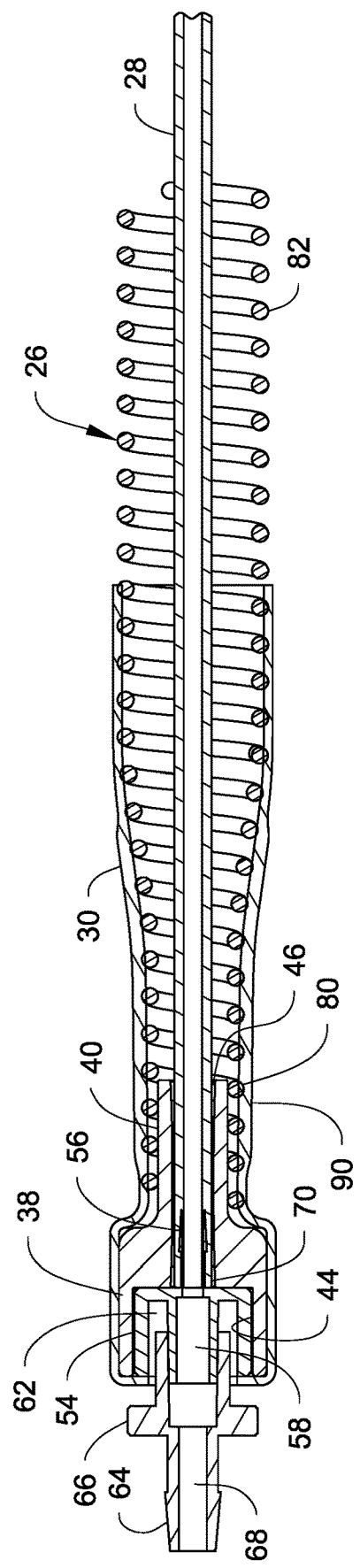
FIG. 4 is a longitudinal cross-sectional view of the pitot probe assembly of FIG. 2.

Referring to FIGS. 2-4, details of the pitot probe assembly 12 are illustrated. As best seen in FIG. 3, the pitot probe assembly 12 includes a sleeve member 20, a socket member 22, a plug 24, a coil spring 26, a pressure tube 28, and a damper shroud 30. When the components of the pitot probe assembly 12 are assembled and the assembly 12 mounted on the UAV 10, the pitot probe assembly 12 is exposed to the airflow as the UAV 10 flies through the air for measuring air pressure. The depicted pitot probe assembly 12 is configured as a total pressure probe to measure total pressure. However, the assembly 12 can also be configured as a pitot static probe that measures both total pressure and static pressure. The pitot probe assembly 12 is connected to a pressure sensor 32 disposed on the UAV 10, for example in the wing 14b or in the fuselage 16, which receives the total pressure from the assembly 12 for use in calculating the velocity of the UAV 10.

With continued reference to FIGS. 2-4, the sleeve member 20 is a generally cylindrical member having a first end 34 and a second end 36. The sleeve member 20 can be formed from a non-metallic material such as, but not limited to, plastic. A receptacle portion 38 extends from the first end 34 toward the second end 36, and a post portion 40 extends from the second end 36 toward the receptacle portion 38. The receptacle portion 38 has a diameter that is greater than a diameter of the post portion 40, and a shoulder 42 is defined at the junction between the receptacle portion 38 and the post portion 40.

The receptacle portion 38 is configured to receive some or all of the socket member 22, while the post portion 40 is configured to support the coil spring 26. In particular, as best seen in FIG. 4, the receptacle portion 38 includes a receptacle or recess 44 defined therein that extends from the first end 34. The receptacle 44 defines a space that is large enough to receive the socket member 22. In the example illustrated in FIG. 4, the entire socket member 22 is received in the receptacle 44. The socket member 22 can be removably secured in the receptacle 44 via a friction fit, or the socket member 22 can be permanently secured in the receptacle 44 via an adhesive or fusing the material of the socket member 22 to the sleeve member 20. In addition, the sleeve member 20 includes a sleeve passageway 46 that extends through the sleeve member 20 from the first end 34 to the second end 36.

The socket member 22 is a generally cylindrical member having a first end 50 and a second end 52. The sleeve member 22 can be formed from a non-metallic material such as, but not limited to, plastic. The socket member 22 forms an interface between the plug 24 and the tube 28. The socket member 22 includes a portion 54 extending from the first end 50 that is sized to closely fit within the receptacle 44 of the sleeve member 20. The opposite end 56 of the socket member 22 is formed as a hose nipple for connection to the tube 28. The socket member 22 also includes a socket passageway 58 extending therethrough from the first end 50 to the second end 52 that is aligned with the sleeve passageway 46 through the sleeve member 20. As depicted in FIG. 4, when the socket member 22 is inserted into the sleeve member 20, the portion 54 is completely received in the receptacle 44 and the hose nipple is disposed in the sleeve passageway 46.

The plug 24 is a generally cylindrical member that forms the tip of the pitot probe assembly 12. The plug 24 can be formed from a non-metallic material such as, but not limited to, plastic. The plug 24 includes an end 60 that is configured to be removably secured in a receiving bore 62 defined in the portion 54 of the socket member 22 as best seen in FIG. 4. In one non-limiting example, the end 60 can have threads that engage with threads on the portion 54 whereby the plug 24 is removably screwed into the socket member 22. Other techniques for removably securing the end 60 to the portion 54 can be used including, but not limited to, a friction or interference fit. An opposite end 64 of the plug 24 faces the direction of flight and faces the airflow and forms an air inlet. An enlarged flange 66 is formed on the plug 24 to provide a gripping surface to facilitate gripping of the plug 24 during installation and removal of the plug 24. A plug passageway 68 extends through the plug 24 that is aligned with the socket passageway 58 and with the sleeve passageway 46. In some embodiments, the end 60 is not removably secured to the portion 54. For example, an adhesive can be used to non-removably secure the plug 24 to the socket member 22.

The tube 28 directs air from the pitot probe assembly 12 to the pressure sensor 32. The tube 28 has a first end 70 and a second end 72. The tube 28 extends through the spring 26 and into the post portion 40 where the end 70 fits around and is secured to the hose nipple of the portion 56. The second end 72 of the tube 28 is connected to the pressure sensor 32.

The coil spring 26 provides resiliency and flexibility to the pitot probe assembly 12, for example when the pitot probe assembly 12 impacts an obstacle. The coil spring 26 can be a metal spring and has a first portion 80 engaged with the sleeve member 20, for example being disposed around the post portion 40 and optionally abutting against the shoulder 42. As best seen in FIGS. 3 and 4, the first portion 80 has a first diameter and a second portion 82 of the spring 26 has a second diameter that is greater than the first diameter. At least a portion of the coil spring 26 projects forwardly from the leading edge of the wing 14b. For example, the entire first portion 80 and some of the second portion 82 can project forwardly from the leading of the wing 14b.

The damper shroud 30 acts as a damper on the coil spring 26 and also covers the portions of the coil spring 26 that project forwardly from the leading edge of the wing 14b to prevent ingress of contaminants. As best seen in FIG. 4, in addition to covering the coil spring 26, the shroud 30 can also extend over and contact a front end of the receptacle portion 38 of the sleeve member 20, and can extend over and contact the outer surface of the receptacle portion 38.

In one embodiment, the damper shroud 30 can be a heat shrink sleeve that can be initially positioned around the pitot probe assembly 12 and then heat is applied to cause the sleeve to shrink and conform around the receptacle portion 38 and the coil spring 26. However, other forms of damper shrouds 30 can be used.

The damper shroud 30 can be configured to tailor the damping that is provided to desired portions of the coil spring 26. For example, referring to FIG. 4, the portion 90 of the shroud 30 covering and contacting the first portion 80 can be thicker than the other portions of the shroud 30. This thicker portion can be formed in any suitable manner including, but not limited to, forming the shroud 30 to have a varying thickness or applying a first sleeve around the first portion 80 of the coil spring 26 and applying a second sleeve around the first sleeve where the first sleeve and the second sleeve together form the damper shroud 30. In another embodiment, the portion 90 of the shroud 30 can be thinner than other portions of the shroud 30, or the shroud 30 can have a constant thickness along its entire length.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A pitot probe assembly, comprising:
    a sleeve member having a receptacle portion that extends from a first end of the sleeve member toward a second end thereof, and a post portion that extends from the second end toward an end of the receptacle portion;
    the receptacle portion includes a receptacle extending from the first end toward the second end;
    a sleeve passageway extending through the sleeve member from the first end to the second end;
    a socket member at least partially received in the receptacle of the receptacle portion, the socket member includes a socket passageway extending therethrough that is aligned with the sleeve passageway through the sleeve member;
    a plug removably attached to the socket member and forming a tip end of the pitot probe assembly, the plug includes a plug passageway extending therethrough that is aligned with the socket passageway and with the sleeve passageway;
    a coil spring having a first end surrounding the post portion of the sleeve member; and
    a tube extending through the coil spring and having a first tube end attached to the socket member.

2. The pitot probe assembly of claim 1, further comprising a shroud surrounding at least a portion of the coil spring and the post portion.

3. The pitot probe assembly of claim 2, wherein the coil spring has a first portion that surrounds the post portion and a second portion having a diameter that is greater than a diameter of the first portion; and the shroud surrounds at least some of the first portion.

4. The pitot probe assembly of claim 3, wherein the shroud surrounds all of the first portion and at least some of the second portion.

5. The pitot probe assembly of claim 2, wherein the shroud contacts the coil spring.

6. The pitot probe assembly of claim 5, wherein the shroud has a first section with a first thickness and a second section with a second thickness, and the first thickness differs from the second thickness.

7. The pitot probe assembly of claim 1, wherein the plug and the socket member each consists of non-metallic material.

8. The pitot probe assembly of claim 7, wherein the non-metallic material comprises plastic.

9. An unmanned aerial vehicle that includes the pitot probe assembly of claim 1 mounted thereon, and a pressure sensor connected to a second tube end of the tube.

10. A total pressure pitot probe assembly, comprising:
    a sleeve member having a sleeve passageway extending through the sleeve member from a first end to a second end thereof;
    a socket member attached to the sleeve member, the socket member includes a socket passageway extending therethrough that is aligned with the sleeve passageway;
    a plug attached to the socket member and forming a tip end of the total pressure pitot probe assembly, the plug includes a plug passageway extending therethrough that is aligned with the socket passageway and with the sleeve passageway;
    a coil spring having a first end engaged with the sleeve member;
    a tube extending through the coil spring and having a first tube end attached to the socket member;
    a damper shroud surrounding and contacting at least a portion of the coil spring.

11. The total pressure pitot probe assembly of claim 10, wherein the coil spring has a first portion that surrounds a portion of the sleeve member and a second portion having a diameter that is greater than a diameter of the first portion; and the damper shroud surrounds and contacts at least some of the first portion.

12. The total pressure pitot probe assembly of claim 11, wherein the damper shroud surrounds and contacts all of the first portion and at least some of the second portion.

13. The total pressure pitot probe assembly of claim 10, wherein the plug and the socket member each consists of non-metallic material.

14. The total pressure pitot probe assembly of claim 13, wherein the non-metallic material comprises plastic.

15. The total pressure pitot probe assembly of claim 10, wherein the shroud has a first section with a first thickness and a second section with a second thickness, and the first thickness differs from the second thickness.

16. An unmanned aerial vehicle that includes the total pressure pitot probe assembly of claim 10, and a pressure sensor connected to a second tube end of the tube.

* * * * *